(12) United States Patent  
Hunt et al.

(10) Patent No.: US 7,479,922 B2
(45) Date of Patent: Jan. 20, 2009

(54) METHOD AND SYSTEM FOR DETERMINING THE LOCATION OF A VEHICLE

(75) Inventors: Kenneth Edward Hunt, Rock Hill, SC (US); Mark Alvin Schmidt, Charlotte, NC (US); David Roy Holm, Oconomowoc, WI (US); Michael Alan Zeitzew, Los Angeles, CA (US); Scott Adam Stephens, Phoenix, AZ (US)

(73) Assignee: Deere & Company, Moline, IL (US)

( * ) Notice: Subject to any disclaimer, the term of this patent is extended or adjusted under 35 U.S.C. 154(b) by 280 days.

(21) Appl. No.: 11/095,838

(22) Filed: Mar. 31, 2005

(65) Prior Publication Data

US 2006/0220954 A1 Oct. 5, 2006

(51) Int. Cl.
  *G01S 1/00* (2006.01)
  *G01S 5/14* (2006.01)
(52) U.S. Cl. .............. 342/357.02; 342/357.01; 342/357.04; 342/357.06; 342/385
(58) Field of Classification Search ............. 342/357, 342/357.01, 357.06, 357.14, 385
  See application file for complete search history.

(56) References Cited

U.S. PATENT DOCUMENTS

| | | | |
|---|---|---|---|
| 3,659,085 A | 4/1972 | Potter et al. | |
| 4,710,020 A | 12/1987 | Maddox et al. | |
| 4,829,442 A | 5/1989 | Kadonoff et al. | |
| 4,833,480 A | 5/1989 | Palmer et al. | 342/125 |
| 4,873,449 A | 10/1989 | Paramythioti et al. | |
| 5,307,271 A | 4/1994 | Everett, Jr. et al. | |
| 5,375,059 A | 12/1994 | Kyrtsos et al. | |
| 5,390,125 A | 2/1995 | Sennott et al. | |
| 5,438,517 A | 8/1995 | Sennott et al. | |
| 5,491,476 A | 2/1996 | DiBella | |
| 5,610,815 A | 3/1997 | Gudat et al. | |
| 5,640,323 A | 6/1997 | Kleimenhagen et al. | |
| 5,657,226 A | 8/1997 | Shin et al. | |
| 5,657,317 A | 8/1997 | Mahany et al. | |
| 5,810,105 A | 9/1998 | Trainer | |
| 5,874,918 A | 2/1999 | Czarnecki et al. | |

(Continued)

FOREIGN PATENT DOCUMENTS

CA 1271546 7/1990

(Continued)

OTHER PUBLICATIONS

Jwo, D.-J., "Optimisation and sensitivity analysis of GPS receiver tracking loops in dynamic environments", IEE Proceedings: Radar, Sonar & Navigation, Institution of Electrical Engineers, GB, vol. 148, No. 4, Aug. 1, 2001, pp. 241-250.

*Primary Examiner*—Harry Liu

(57) ABSTRACT

A first location determining receiver determines a first location estimate of a vehicle. The first location determining receiver is associated with satellite beacons. A second location determining receiver determines a second location estimate of a vehicle. The second location determining receiver is exclusively associated with terrestrial beacons. A selector selects the first location estimate of the vehicle as a preferential location in accordance with an initialization scheme for the vehicle in a work area. A filtering module applies a first weight to a first location and a second weight to the second location to derive a weighted estimate as the preferential location upon satisfactory completion of the initialization scheme.

11 Claims, 6 Drawing Sheets

U.S. PATENT DOCUMENTS

| | | |
|---|---|---|
| 5,933,079 A | 8/1999 | Frink |
| 5,974,347 A | 10/1999 | Nelson |
| 5,982,164 A | 11/1999 | Czarnecki et al. |
| 5,986,602 A | 11/1999 | Frink |
| 6,011,974 A | 1/2000 | Cedervall et al. |
| 6,057,800 A * | 5/2000 | Yang et al. ............. 342/357.08 |
| 6,072,421 A | 6/2000 | Fukae et al. |
| 6,107,959 A * | 8/2000 | Levanon ................ 342/357.01 |
| 6,107,960 A * | 8/2000 | Krasner ................. 342/357.09 |
| 6,125,135 A | 9/2000 | Woo et al. |
| 6,212,448 B1 | 4/2001 | Xydis |
| 6,327,534 B1 * | 12/2001 | Levanon et al. ............. 701/215 |
| 6,369,754 B1 * | 4/2002 | Levanon ................ 342/357.16 |
| 6,407,703 B1 * | 6/2002 | Minter et al. ............... 342/450 |
| 6,420,999 B1 * | 7/2002 | Vayanos ................ 342/357.03 |
| 6,424,264 B1 | 7/2002 | Giraldin et al. |
| 6,427,079 B1 | 7/2002 | Schneider et al. |
| 6,459,966 B2 | 10/2002 | Nakano et al. |
| 6,489,917 B2 | 12/2002 | Geisheimer et al. |
| 6,556,942 B1 | 4/2003 | Smith |
| 6,560,536 B1 * | 5/2003 | Sullivan et al. ............. 701/214 |
| 6,614,721 B2 * | 9/2003 | Bokhour ..................... 367/128 |
| 6,640,154 B2 | 10/2003 | Breuer |
| 6,798,376 B2 * | 9/2004 | Shioda et al. .......... 342/357.02 |
| 6,861,979 B1 * | 3/2005 | Zhodzishsky et al. .. 342/357.03 |
| 7,026,992 B1 | 4/2006 | Hunt et al. |
| 2001/0020214 A1 * | 9/2001 | Brenner .................... 701/213 |
| 2001/0022506 A1 | 9/2001 | Peless et al. |
| 2001/0027360 A1 | 10/2001 | Nakano et al. |
| 2001/0051527 A1 | 12/2001 | Kuwahara et al. |
| 2002/0050944 A1 * | 5/2002 | Sheynblat et al. ...... 342/357.06 |
| 2002/0097181 A1 | 7/2002 | Chou et al. |
| 2002/0175854 A1 * | 11/2002 | Shioda et al. ............ 342/357.1 |
| 2003/0005030 A1 | 1/2003 | Sulton et al. |
| 2003/0007473 A1 | 1/2003 | Strong et al. |
| 2004/0032363 A1 | 2/2004 | Schantz et al. |
| 2005/0002481 A1 | 1/2005 | Woo et al. |
| 2005/0192024 A1 * | 9/2005 | Sheynblat ................ 455/456.1 |
| 2006/0025894 A1 * | 2/2006 | O'Connor et al. ............... 701/1 |
| 2006/0150584 A1 | 7/2006 | Weiss |
| 2006/0224307 A1 | 10/2006 | Schmidt et al. |
| 2006/0224308 A1 | 10/2006 | Schmidt et al. |
| 2006/0224309 A1 | 10/2006 | Schmidt et al. |

FOREIGN PATENT DOCUMENTS

| | | |
|---|---|---|
| EP | 0732641 | 9/1999 |
| EP | 1 251 362 A2 | 10/2002 |
| WO | WO 98/34124 | 8/1998 |
| WO | 03101178 | 12/2003 |

* cited by examiner

METHOD AND SYSTEM FOR DETERMINING THE LOCATION OF A VEHICLE

FIELD OF THE INVENTION

This invention relates to a method and system for determining the location of a vehicle.

BACKGROUND OF THE INVENTION

Location-determining systems may comprise location-determining receivers (e.g., Global Positioning System receivers) that receive signals from satellite beacons to estimate the location of a vehicle. However, terrain, buildings, vegetation, or other natural or man-made obstructions may reduce the signal strength and reliability of the received signals, hence, the accuracy of location estimates of the vehicle. Thus, there is a need to augment or enhance the location-determining capability of the location-determining receiver to improve accuracy or reliability of location estimates of the vehicle.

SUMMARY OF THE INVENTION

In accordance with one aspect of the invention, a first location determining receiver determines a first location estimate of a vehicle. The first location determining receiver is associated with satellite beacons. A second location determining receiver determines a second location estimate of a vehicle. The second location determining receiver is exclusively associated with terrestrial beacons. A selector selects the first location estimate of the vehicle as a preferential location in accordance with an initialization scheme for the vehicle in a work area. A filtering module applies a first weight to a first location and a second weight to the second location to derive a weighted estimate as the preferential location upon satisfactory completion of the initialization scheme.

DESCRIPTION OF THE PREFERRED EMBODIMENT

Figure 1:
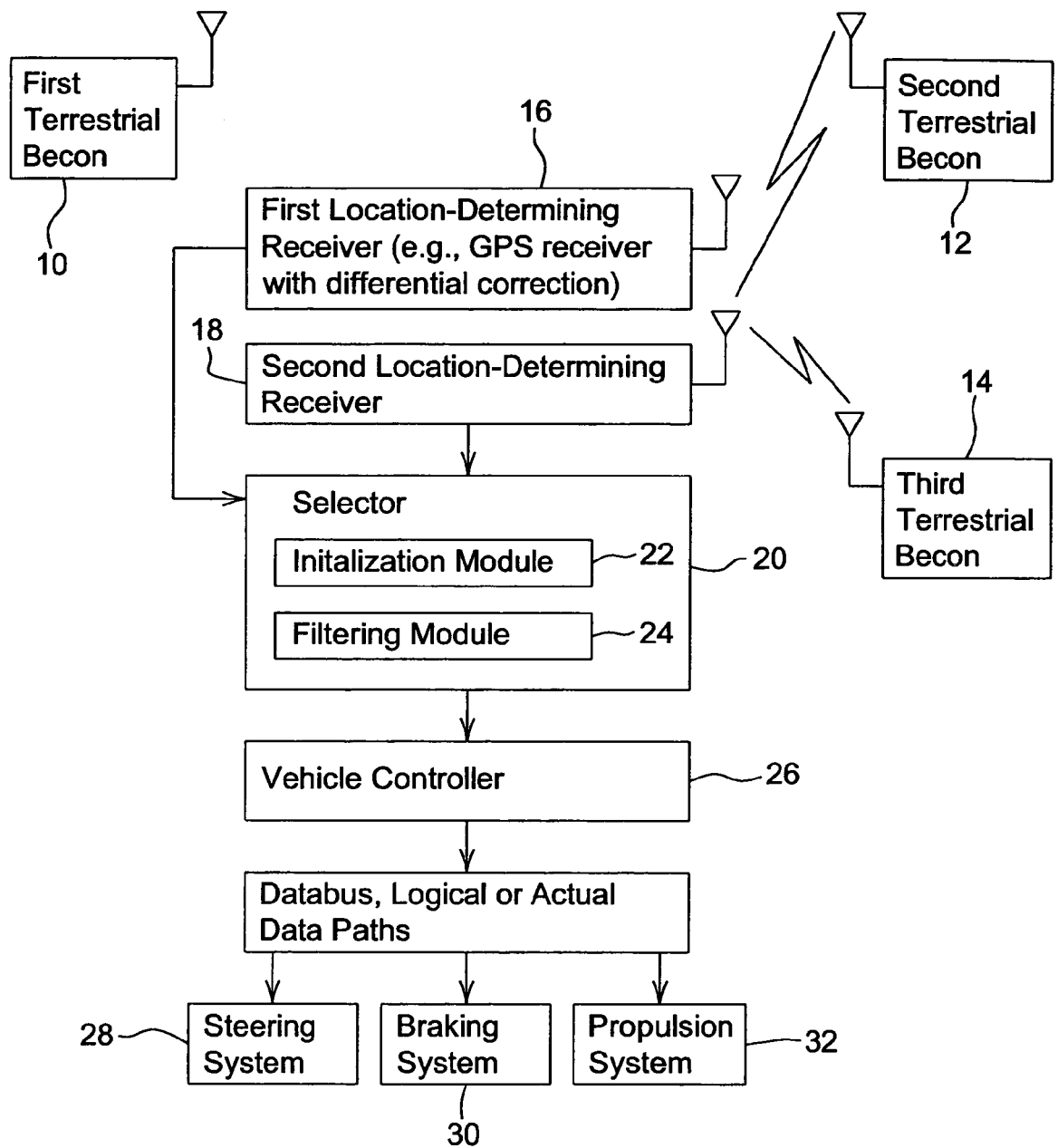
FIG. 1 is a block diagram of a first embodiment of a system for determining a location of a vehicle.

In accordance with the first embodiment of FIG. 1, the system comprises a first location-determining receiver 16 and a second location-determining receiver 18 coupled to a selector 20. In turn, the selector 20 is coupled to a vehicle controller 26. The vehicle controller 26 communicates with one or more of the following via a logical data path, a physical data path, or a databus represented by the arrows in FIG. 1: steering system 28, braking system 30, and propulsion system 32.

A first terrestrial beacon 10, a second terrestrial beacon 12, and a third terrestrial beacon 14 (or their associated antennas) are positioned at known, fixed locations. For example, the known fixed locations may be around or near a perimeter of a work area. The terrestrial beacons transmit a transmission signals (e.g., an identifiable pulses) that may be received by the second location-determining receiver 18.

The first location-determining receiver 16 may comprise a Global Positioning System (GPS) receiver, a GPS receiver with differential correction, or the like.

The second location-determining receiver 18 may comprise a radio frequency ranging system, a microwave ranging system, a local positioning system, a laser positioning system, an optical positioning system. The optical or laser positioning system may be operated in the visible light spectrum, infrared spectrum, near-infrared spectrum, or ultra-violet light spectrum, for example. The second location-determining receiver 18 may provide a greater update frequency of second location estimate than the first location-determining receiver 16 for the first location estimate. For example, the second location-determining receiver 18 may provide an update frequency of approximately one-hundred (100) Hertz or greater, whereas the first location-determining receiver 16 may provide an update frequency of approximately five (5) to approximately ten (10) Hertz.

The selector 20 comprises an initialization module 22 and a filtering module 24. The initialization module 22 handles the selection of the location data associated with the first location-determining receiver 16 or the second location-determining receiver 18 during an initialization phase, such as after first starting or turning on the work vehicle. In contrast, the filtering module 24 handles the selection or allocation of location data associated with the first location-determining receiver 16, the second location-determining receiver 18, or both after the initialization phase is complete or during an operational phase.

The initialization module 22 may use a data processor (e.g., digital signal processor) to apply a rule-based approach in assigning control to the initialization module 22 or the filtering module 24, but not both simultaneously, over selection of the first location estimate or second location estimate. Further, if the Dilution of Precision (DOP) of the first location estimate is less than a minimum threshold for a certain period of time, the initialization module 22 may stop the vehicle or trigger an alert to a portable hand held user device via an optional wireless communications device (not shown) associated with the selector 20.

In one embodiment, the filtering module 24 comprises a minimum mean square error filter. For example, the minimum mean square error filter may support the ability to assign distinct weights to measurements, such as the first location estimate of the first location-determining receiver 16 and the second location estimate of the second receiver. The minimum mean square error filter may allow the first location estimate and the second location estimate to be weighted inversely proportional to the variances. The first location estimate and the second location estimate may vary in conformance with a generally Guassian distribution or another probability density function. The minimum mean square error filter may support a robust soft transition or handover between the first location estimate and the second location estimate of the different location determining receivers.

In another embodiment, the filtering module 24 may comprise a Kalman filter or a modified Kalman filter that accepts an input of first location estimate data from the first location-determining receiver 16 and second location estimate data from the second location-determining receiver 18 and outputs a resultant location data (e.g, blended location data). The resultant location data may comprise an error signal or corrective signal referenced to the first location estimate or the second location estimate, for example. The Kalman filter may be defined as a sequential estimator of state vectors (e.g., vehicular locations) of a vehicle with memory that degrades based on a noise model between updates of a state vector after one or more observations. The Kalman filter may be configured to reduce or minimize the mean square estimation error of the state vector, for example. Although the Kalman filter is used as an example herein, other suitable filters (e.g., minimum mean square error filter) may be applied to carry out any of the embodiments set forth herein.

Figure 2:
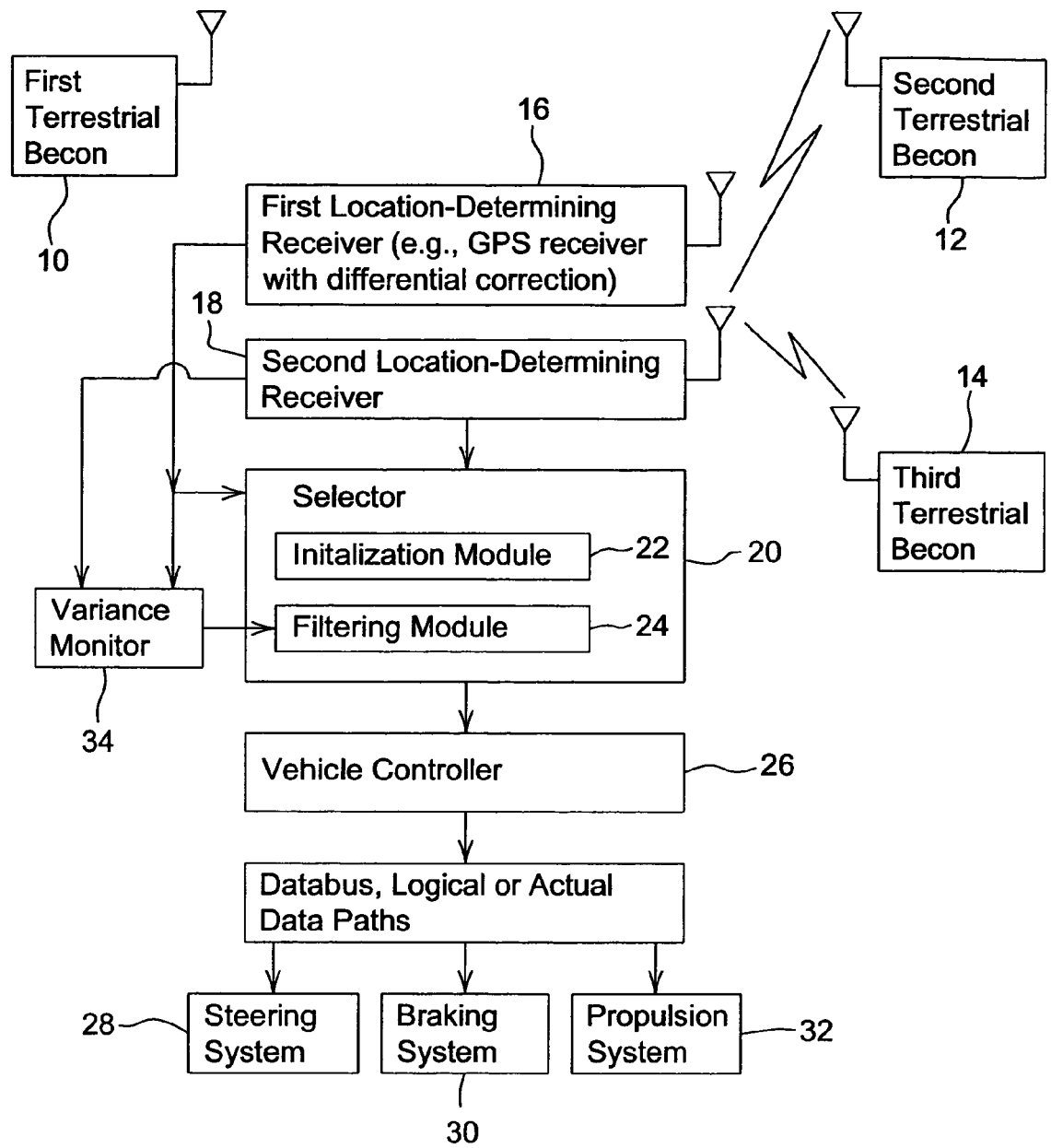
FIG. 2 is a block diagram of a second embodiment of a system for determining a location of a vehicle.

The system of FIG. 2 is similar to the system of FIG. 1, except the system of FIG. 2 further includes a variance monitor 34. Like reference numbers in FIG. 1 and FIG. 2 indicate like elements. The variance monitor 34 receives input data from the first location-determining receiver, the second location-determining receiver 18 and provides an output data to the selector 20 or filtering module 24. The variance monitor 34 may detect or record a first variance associated with the location data of the first location-determining receiver 16. Further, the variance monitor 34 may detect or record a second variance associated with the location data of the second location-determining receiver 18. The variance module may instruct the filtering module 24 to apply filter weights that are based on the first variance, the second variance, or both. The filter weights may determine the relative contributions of location data of the first location-determining receiver 16, the second location-determining receiver 18, or both.

Figure 3:
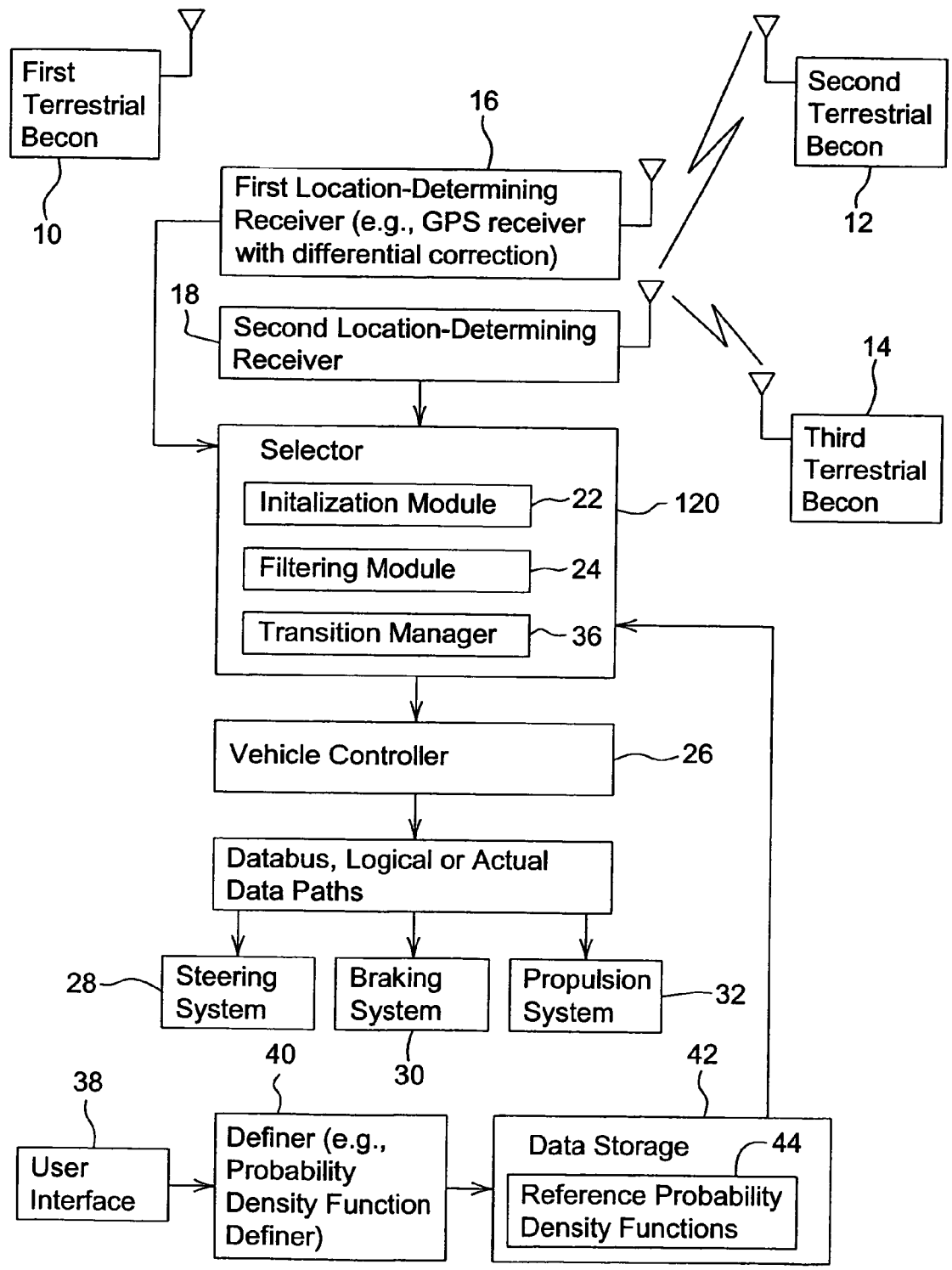
FIG. 3 is a block diagram of a third embodiment of a system for determining a location of a vehicle.

The system of FIG. 3 is similar to the system of FIG. 1 except the system of FIG. 3 further includes a transition manager 36, a user interface 38, a definer 40 (e.g., probability density function definer), and data storage 42. Like reference numbers in FIG. 1 and FIG. 3 indicate like elements.

A user interface 38 is associated with a definer 40 (e.g., probability density function definer). The definer 40 (e.g., probability density function definer) is coupled to a data storage 42 device. The data storage 42 device may store reference probability density functions 44 for example. The data storage 42 device or the definer 40 (e.g., probability density function definer) communicates to the selector 20. At the selector 20, the transition manager 36 adjusts a transition between dominant first location estimate of the first location-determining receiver 16 and dominance second location estimate of the second location-determining receiver 18. The transition manager 36 may provide a gradual, seamless, or transparent switch between the domination of the first location estimate and the second location estimate.

Figure 4:
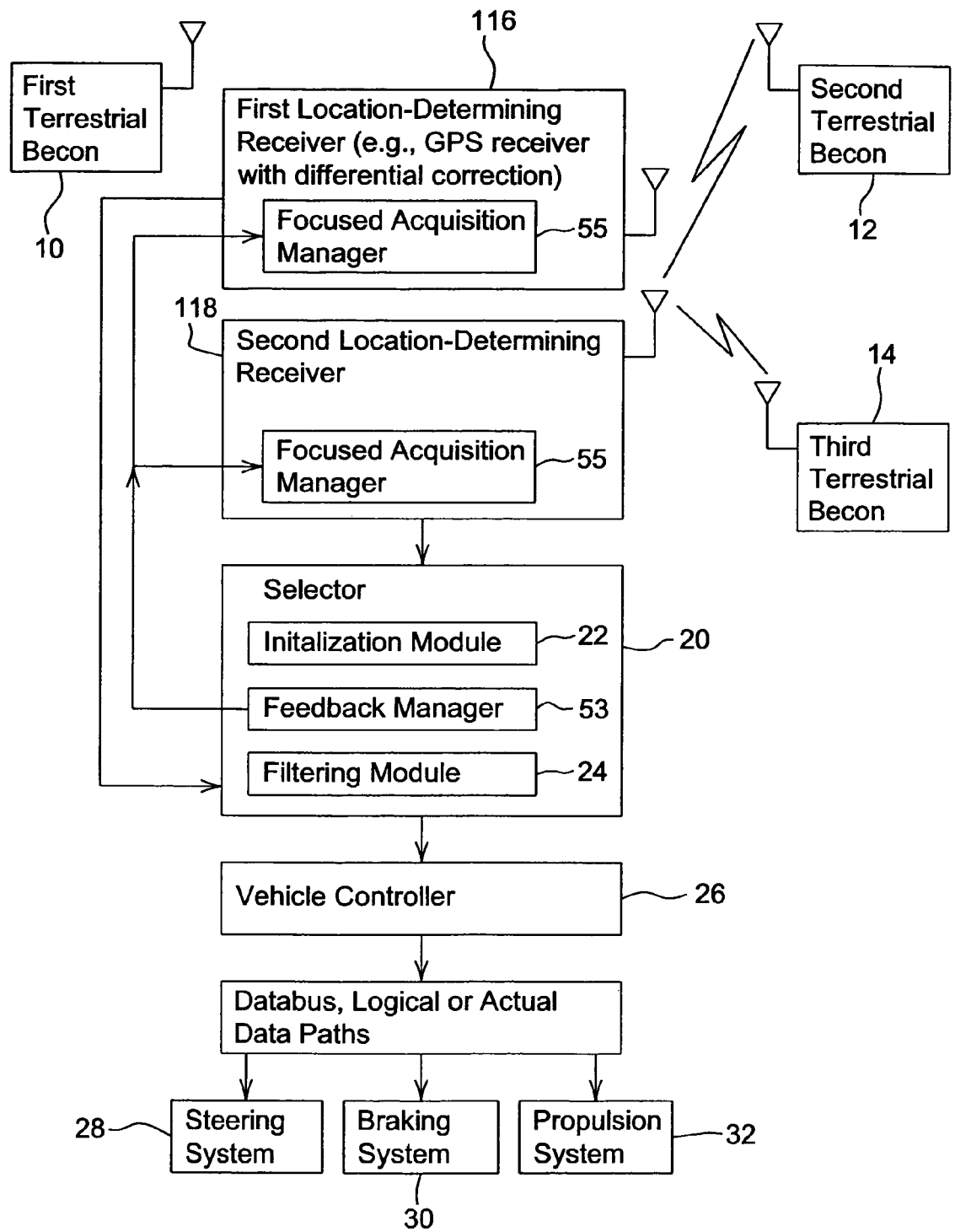
FIG. 4 is a block diagram of a fourth embodiment of a system for determining a location of a vehicle.

The system of FIG. 4 is similar to the system of FIG. 1, except FIG. 4 illustrates the provision of feedback from a feedback manager 53 associated with the filter to the first location-determining receiver 116 and the second location-determining receiver 118 equipped with focused acquisition managers 55.

The filtering module 24 or feedback manager 53 provides measurement predictions and variances (e.g., the filter states or filter weights) from the filtering module back to at least one of the focused acquisition managers 55. The focused acquisition manager 55 of the first location-determining receiver 116 may limit its tracking loop to acquire location measurement data over a smaller parameter space (e.g., finely tuned geographic scope). Similarly, the focused acquisition manager 55 of the second location-determining receiver 118 may limit its tracking loop to acquire location measurement data over a smaller parameter space (e.g., finely tuned geographic scope). For example, the smaller parameter space may refer to tracking only residual dynamics or differential changes, as opposed to absolute measurement data that requires greater processing resources to process and bandwidth to communicate.

Figure 5:
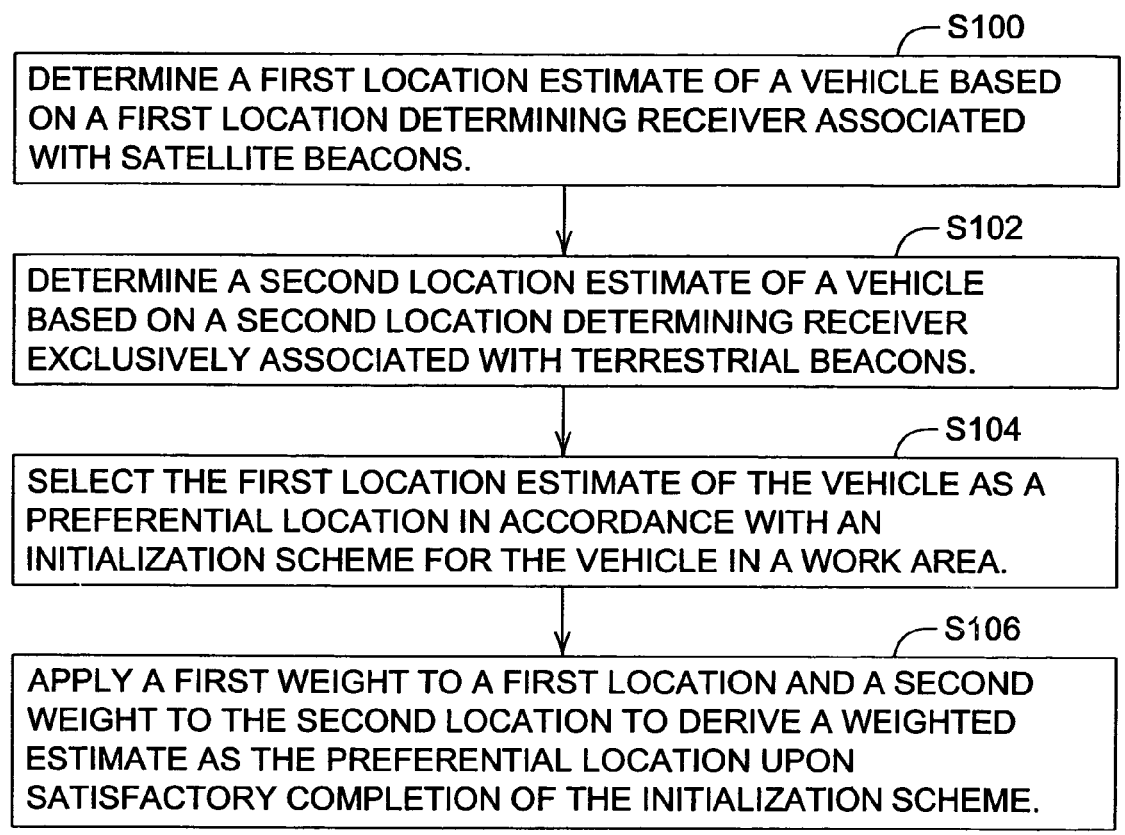
FIG. 5 is a flow chart of a method for determining a location of a vehicle.

The method of FIG. 5 provides one example of a method for determining the location of a vehicle in a work area. The method of FIG. 5 begins in step S100.

In step S100, a first location-determining receiver 16 determines a first location estimate of a vehicle based on a first location-determining receiver 16 associated with satellite beacons.

In step S102, a second location-determining receiver 18 determines a second location estimate of a vehicle based on a second location-determining receiver 18 exclusively associated with terrestrial beacons.

In step S104, a selector 20 selects a first location estimate of the vehicle as a preferential location in accordance with an initialization scheme for the vehicle in a work area. The initialization scheme may be defined in accordance with various alternatives. Under a first alternative, the initialization scheme comprises a time period between start-up of a vehicle and moving the vehicle into a defined home position in a work area for execution of a task in the work area. Under a second alternative, the initialization scheme comprises a time period between start-up of a vehicle and moving the vehicle into a defined home position in a work area for execution of a path plan in the work area. Under a third alternative, the initialization scheme comprises a time period between start-up of a vehicle and verification that the second location-determining receiver 18 receives at least one of a pilot signal and an initialization transmission associated with the stationary beacons around the work area.

In step S106, a filtering module 24 applies a first weight to a first location and a second weight to the second location to derive a weight estimate as the preferential location upon satisfactory completion of the initialization scheme. The application of weights in step S106 may be carried out in accordance with various techniques, that may be applied individually or cumulatively. Under a first technique, a variance monitor 34 or filtering module 24 establishing the first weight based on a first variance of the first location estimate such that the first weight varies inversely to the first variance. Further, the variance monitor 34 or filtering module 24 establishes the second weight based on a second variance of the second location estimate such that the second weight varies inversely with the second variance.

Under a second technique, the filtering module 24 applies the first weight and the second weight that conform to a least squares estimation for the first location estimate and the second location estimate, respectively. For example, the least squares estimation may apply calculus equations to estimate the parameter values of a linear model (e.g., a line equation) that minimize the sum of the squared deviations between the observed values (e.g., measurements) and at least a portion of the linear model.

If the line equation is $y=mx+b$, where m is the estimated slope to be optimized and b is the estimated y axis intercept (of the line) to be optimized, where the x axis and y axis are perpendicular to each other, then the least squares estimates for the parameter values are $$m = \frac{\sum_{i=1}^{n}(x_i - \bar{x})(y_i - \bar{y})}{\sum_{i=1}^{n}(x_i - \bar{x})^2} \text{ and } b = \bar{y} - m\bar{x},$$

where the bar over the x and y indicate a arithmetic mean value of x and y, respectively, where n is the total number of measurement values averaged, values of $x_i$ are the predictor variables, and i is a measurement value which ranges from 1 to n, where n is positive whole number.

Under a third technique, the filtering module 24 applies the first weight and the second weight that conform to a least squares estimation for the first location estimate and the second location estimate as in the second technique. In addition, the least squares estimation is consistent with a generally linear relationship of the first location estimate and the second location estimate over time for the third technique.

Under a fourth technique, the filtering module 24 applies the first weight and the second weight that conform to a weighted least squares estimation for the first location estimate and the second location estimate, respectively. The weighted least squares approach is similar to the least squares approach except each observation or measurement in the data set is weighted to determine its contribution.

Figure 6:
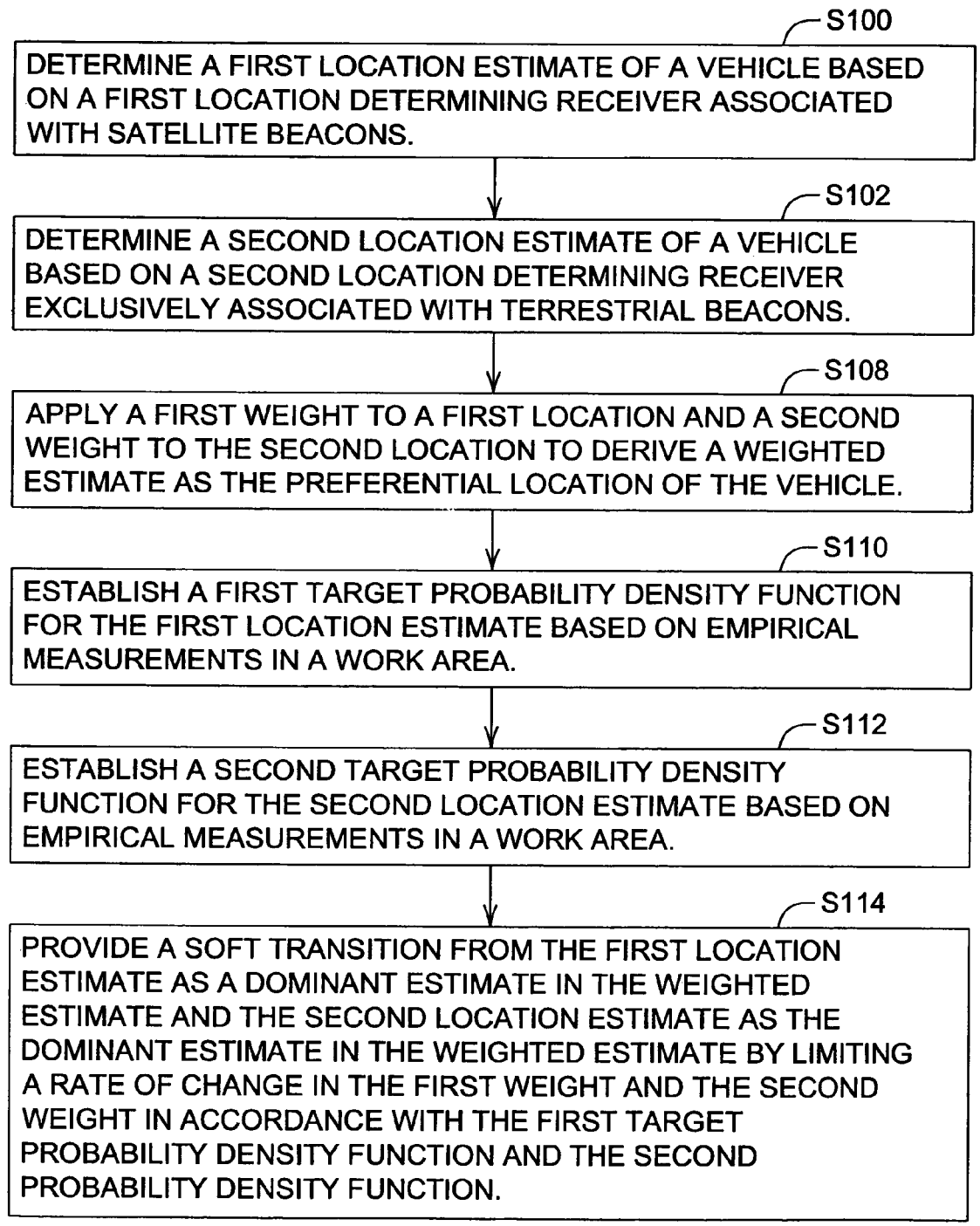
FIG. 6 is a flow chart of another method for determining a location of a vehicle.

The method of FIG. 6 provides one example of another method for determining the location of a vehicle in a work area. The method of FIG. 6 starts in step S100. Like procedures or steps carry like reference numbers in FIG. 5 and FIG. 6.

In step S100, a first location-determining receiver 16 determines a first location estimate of a vehicle based on a first location-determining receiver 16 associated with satellite beacons.

In step S102, a second location-determining receiver 18 determines a second location estimate of a vehicle based on a second location-determining receiver 18 exclusively associated with terrestrial beacons.

In step S108, a filtering module 24 or selector 20 applies a first weight to a first location and a second weight to the second location to derive a weighted estimate as a preferential location of the vehicle.

In step S110, the definer 40 (e.g., probability density function definer) or data storage 42 establishes a first target probability density function for the first location estimate based on empirical measurements in a work area.

In step S112, the definer 40 (e.g., probability density function definer) or data storage 42 estimates a second target probability density function for the second location estimate based on empirical measurements in the work area.

In step S114, the selector 20 or the transition manager 36 provides a soft transition from the first location estimate as a dominant estimate in the weighted estimate and the second location estimate as a dominant estimated in the weighted estimate by limiting a rate of change in the first weight and the second weight in accordance with the first target probability density function and the second probability density function.

Having described the preferred embodiment, it will become apparent that various modifications can be made without departing from the scope of the invention as defined in the accompanying claims.

The following is claimed:

1. A system for accurately determining a location of a vehicle, the system comprising:

a first location determining receiver for determining a first location estimate of a vehicle, the first location estimate based on a first location determining receiver associated with satellite beacons;

a second location determining receiver for determining a second location estimate of a vehicle, the second location estimate based on a second location determining receiver exclusiveiy associated with terrestrial beacons;

a selector for selecting initially the first location estimate, associated with the satellite beacons, as a preferential location in accordance with an initialization scheme for the vehicle in a work area;

a filtering module for applying a first weight to the first location estimate and a second weight to the second location estimate to derive a weighted estimate as the preferential location upon satisfactory completion of the initialization scheme;

a focused acquisition manager associated with at least one of the first location determining receiver and the second location determining receiver for limiting a tracking loop of location measurement data; and a feedback manager for providing measurement predictions and variances from the filtering module to the focused acquisition manager.

2. The system according to claim 1 further comprising:
a variance monitor for establishing the first weight based on a first variance of the first location estimate and for establishing a second weight based on a second variance of the second location estimate such that the first weight varies inversely to the first variance and such that the second weight varies inversely with the second variance.

3. The system according to claim 1 further comprising:
a definer for establishing a first target probability density function for the first location estimate based on empirical measurements in a work area and for establishing a second target probability density function for the second location estimate based on empirical measurements in the work area; and a transition manager for providing a soft transition from a first location estimate as the dominant estimate and a second location estimate as the dominant estimate by limiting a rate of change in the first weight and the second weight in accordance with the first target probability density function and the second probability density function.

4. The system according to claim 1 wherein the initialization scheme comprises a time period between start-up of a vehide and moving the vehicle into a defined home position in a work area for execution of a task in the work area.

5. The system according to claim 1 wherein the initialization scheme comprises a time period between start-up of a vehicle and moving the vehicle into a defined home position in a work area for execution of a path plan in the work area.

6. The system according to claim 1 wherein the initialization scheme comprises a time period between start-up of a vehicle and verification that the second location determining receiver receives at least one of a pilot signal and an initialization transmission associated with the stationary beacons around the work area.

7. The system according to claim 1 wherein the filtering module is arranged to apply the first weight and the second weight to conform to a least squares estimation for the first location estimate and the second location estimate.

8. The system according to claim 7 wherein the least squares estimation is consistent with a generally linear relationship of the first location estimate and the second location estimate over time.

9. A method for accurately determining a location of a vehicle, the method comprising:

determining a first location estimate of a vehicle, the first location estimate based on a first location determining receiver exclusively associated with satellite beacons;

determining a second location estimate of a vehicle, the second location estimate based on a second location determining receiver exclusively associated with terrestrial beacons;

applying a first weight to the first location estimate and a second weight to the second location estimate;

adjusting a transition from the first location estimate as a dominant estimate in the weighted estimated and the second location estimate as the dominant estimate in the weighted estimate by limiting a rate of change in the first weight and the second weight; and communicating the dominant estimate to at least one of a steering system, a braking system, and a propulsion system of the vehicle.

10. The method of claim 9 further comprising establishing a first target probability density function for the first location estimate and establishing a second target probability density function for the second location estimate; and wherein the rate of change is limited in accordance with the first target probability density function and the second probability density function.

11. A system for accurately determining a location of a vehicle, the system comprising:

a first location determining receiver, coupled to a filtering module, for determining a first location estimate of a vehicle, the first location estimate based on the first location determining receiver exclusively associated with satellite beacons;

a second location determining receiver, coupled to the filtering module, for determining a second location estimate of a vehicle, the second location estimate based on the second location determining receiver exclusively associated with terrestrial beacons;

the filtering module applying a first weight to the first location estimate and a second weight to the second location estimate, providing a transition of a dominant estimate from one of the weighted first location estimate and the weighted second location estimate by limiting a rate of change in the first weight and the second weight, and communicating the dominant estimate to at least one of a steering system, a braking system, and a propulsion system of the vehicle.

* * * * *